United States Patent [19]

Beehler

[11] Patent Number: 4,748,070
[45] Date of Patent: May 31, 1988

[54] FILM/FIBER LAMINATES
[75] Inventor: David C. Beehler, Landenburg, Pa.
[73] Assignee: Hercules Incorporated, Wilmington, Del.
[21] Appl. No.: 842,971
[22] Filed: Mar. 24, 1986
[51] Int. Cl.⁴ ............................................. B37B 27/14
[52] U.S. Cl. .................................... 428/198; 156/290; 428/286; 428/340; 428/516; 428/970
[58] Field of Search ............... 428/340, 286, 516, 910, 428/198; 156/290

[56] References Cited

U.S. PATENT DOCUMENTS

| 4,035,543 | 7/1977 | Draper et al. | 428/515 |
| 4,181,550 | 1/1980 | Paine | 428/474.4 |
| 4,288,499 | 9/1981 | Kielbania, Jr. | 428/516 |
| 4,348,444 | 9/1982 | Craig | 428/252 |

FOREIGN PATENT DOCUMENTS 86057  8/1983  European Pat. Off. ............ 156/290

Primary Examiner—John E. Kittle
Assistant Examiner—P. R. Schwartz
Attorney, Agent, or Firm—William S. Alexander

[57] ABSTRACT

Tear strength of biaxially oriented polypropylene film is increased by laminating thereto a fibrous web of polypropylene fiber under conditions whereby the orientation of the film is retained.

4 Claims, No Drawings

FILM/FIBER LAMINATES

This invention relates to novel films of polypropylene having desirably improved properties compared to heretofore known polypropylene films. Specifically, it relates to polypropylene films having high tear strength in both the longitudinal and transverse directions.

Polypropylene films have captured an ever-increasing share of the synthetic polymer film market in recent years. Food packaging and shrink wrap applications are examples of areas where polypropylene films have made substantial market penetration. Good tensile strength, tensile modulus and moisture vapor impermeability are desirable properties which make polypropylene particularly suitable for these applications.

Biaxially oriented polypropylene film is, however, hampered by having low tear strength. This is particularly the case in the longitudinal direction, the direction of initial orientation, which causes linear orientation of the polymer molecules. In the transverse direction, tear strength is somewhat better, but it is still not good.

The low tear strength of biaxially oriented polypropylene film has precluded its use in most applications where it will be subjected to rough handling. Accordingly, it is limited to relatively light duty applications such as the aforementioned food packaging and shrink wrap uses. In uses where rough handling is likely to be encountered, the likelihood of the film being punctured or of a tear being initiated is greater. A tear, once initiated, tends to propagate readily, destroying the integrity of the film.

It is the object of this invention to provide a film of biaxially oriented polypropylene which has good tear strength in both the longitudinal and transverse directions while retaining, to a great degree, the desirable tensile properties which are normally associated with biaxially oriented polypropylene film.

In another aspect, the invention provides a method of preparing a polypropylene film having improved tear strength.

STATEMENT OF THE INVENTION

In accordance with this invention, there is provided a high tear strength film comprised of a base film of biaxially oriented polypropylene having on one of its surfaces a layer of a lower melting polymer and, thermally bonded to said lower melting polymer layer, and coextensive with the biaxially oriented film, a fibrous polypropylene web.

THE PRIOR ART

Craig, in U.S. Pat. No. 4,348,444, teaches preparation of a fibrous, permeable structure wherein a net structure is plied with an oriented butene-1—propylene copolymer and fused therewith. The heat applied to effect fusion deorients the film causing it to shrink and flow into the openings of the netting. If the netting is applied to both sides of the film, the film fuses the two layers of netting to each other.

Craig, in U.S. Pat. No. 4,348,445, teaches preparation of a film structure comprising an unoriented butene-1—propylene copolymer layer reinforced by fusing a layer of polypropylene netting to one or both sides thereof.

DETAILED DESCRIPTION

The invention contemplates the preparation of reinforced polypropylene film structures which retain, to a considerable degree, the desirable properties of conventional biaxially oriented polypropylene film, while exhibiting substantially increased tear strength. Since the film is exposed to heat and pressure in the process of bonding the film and fiber, there can be some adverse effect on tensile properties, but tensile properties, i.e., tensile strength, elongation and modulus, remain better than are exhibited by other fiber reinforced films.

The base film of biaxially oriented polypropylene film is a known commercially available material produced by either the tenter process or by the blown bubble process. The polypropylene employed in the base film can be propylene homopolymer or it can be a copolymer of propylene with up to about 10% by weight of a second copolymerizable olefin which can be ethylene or a mono-alpha-olefin of 4 to 6 carbon atoms. It can also be a mixture of homopolymer and copolymer. Most commercially available biaxially oriented polypropylene film is homopolymer.

To be operative in this invention, the base film must have a coating of a lower melting polymer on at least one of its surfaces. The melting point of this polymer must be sufficiently lower than that of polypropylene that it can be melted without disturbing the orientation of the base polypropylene film. Examples of such coatings include, e.g., certain copolymers of propylene with other monoolefins, ethylene-vinyl acetate copolymers, low-density polyethylene homopolymers or copolymers and ethylene-ethyl acrylate ionomers. Other lower melting polymers which will adhere to polypropylene and which meet the melting point limitations set forth above can also be used.

The lower melting polymers which are applied to biaxially oriented polypropylene film are well known and are commercially employed at the present time to serve as heat seal coatings. They are normally applied to the film, in-line, during the manufacture of the film. Application is effected by coextrusion, extrusion coating, or by solution or dispersion coating. The application of the lower melting layer is a known operation and forms no part of the invention.

The lower melting coating can be applied to only one or to both surfaces of the base film. The usage contemplated for the high tear strength product will dictate whether the coating is to be applied to both surfaces. That is to say, if an application is contemplated wherein heat stability is desired, both sides will be so coated. It is also feasible to have other coatings as, for example, a metal adherent coating so that the film can be metallized.

The fibrous web applied to the biaxially oriented polypropylene film is also a polypropylene structure. The web can be netting or, more preferably, a nonwoven fabric of either staple fiber or continuous filaments. A particularly useful fibrous web is a thermally bonded nonwoven staple fiber scrim.

The increase of the tear strength of the biaxially oriented polypropylene film is a function of the weight of the fibrous web as are also the physical form and appearance. The weight of the fibrous web should be at least 10 grams per square yard and can be as high as 80 to 85 grams. The weight of the fibrous web is preferably on the low side, i.e., about 10 to 40 grams per square yard in order to retain essentially the physical form, i.e., the degree of flexibility and the feel of the base film. Such a film can be used in most of the applications for which biaxially oriented polypropylene film is employed at the present time except shrink applications.

When higher weight fibrous webs are employed, the biaxially oriented film finds utility in other areas where it has not heretofore been useful. For example, the heavier weight film can be used as a type of tarpaulin for protection of outdoor furniture or other objects from the elements when left outdoors. It can be employed as a book cover material and it is useful as a base for adhesive tape and also as a cover for insulation batting.

Preparation of the reinforced biaxially oriented polypropylene film of this invention using a nonwoven staple fiber scrim as the fibrous web can be carried out relatively simply by forming the scrim in-line with the reinforced film. In this embodiment a carded, unbonded web of thermobonded staple fiber is fed onto the heat sealable surface of the film and fiber-to-fiber thermobonding takes place simultaneously with bonding to the film. Bonding is effected by passing the film through the nip between two heated rolls at a preselected temperature and pressure. One of the rolls has a smooth surface in all cases. The other, which contacts the fibrous web, can be smooth, but preferably it has an embossed surface. The embossment controls the percentage of bonded surface area in the product. It is preferred that the percentage of bonded surface, i.e., the area corresponding to the raised areas of the embossed roll, be between about 10 and 50%, particularly with the lower weight fibrous webs where it is desired to retain as much as possible of the physical character of the base film. For stiffer films, using heavier weight fibrous web, the bonded surface area can be as high as 100%.

Bonding temperature can be between about 75° and 150° C. Above this temperature range, there is a danger that the polypropylene film, being biaxially oriented, may be caused to shrink, even with relatively short contact times. On the lower side, the softening point of the heat seal coating is the limiting factor. For heat seal coatings based on ethylene-vinyl acetate copolymer, the temperature can be as low as 75° C.

Another variable which affects the tear strength of the final product is the pressure in the nip between the rolls during the bonding. Pressure between about 100 and 1,300 pounds per linear inch (pli) have been employed. From about 100 to 160 (pli) is normally satisfactory and represents a preferred range. It is found that tear strength increases as the nip pressure is increased and as the bonding temperature is increased within this preferred range.

An interesting observation with respect to the products prepared according to this invention is that the film and fiber appear to act synergistically with respect to tear strength. That is to say, the tear strength of the laminated and bonded product is substantially greater than that of either component alone. It is believed that tear strength increases beyond either component of the laminate because the laminate is thicker than either of the two components alone and the heat sealable layer does not allow tears to propagate as easily through the fibers at the same time that the fibers do not allow tears to propagate as easily through the film. This will be made apparent by the examples which will be presented hereinbelow.

It is also possible to prepare the fiber/film structures of the invention using a preformed polypropylene staple fiber scrim of the appropriate weight. This is readily accomplished via the procedures described for making the structure in-line. The primary difference is that the carding operation and thermal bonding are already effected so that the scrim is unwound directly from a mill roll and into the bonding nip in contact with the film. Considerations of temperature, pressure and scrim weight are substantially the same. Other forms of fibrous structure which can be employed include "spunbonded" nonwoven, oriented netting and fibrillated film netting.

The invention is illustrated by the following examples. In these examples, the tear strength is the Elmendorf tear strength as specified in ASTM D-1117-80.

EXAMPLE 1

The base film employed in this example was a 1.4 mil opaque biaxially oriented polypropylene homopolymer film having, on one surface, a heat seal coating consisting of a copolymer of 4.25% ethylene and 95.75% propylene. Opacity of the film was imparted by incorporation of calcium carbonate.

The fibrous web was a 10 gram/sq. yard carded web of 1.5 dpf polypropylene which was fed directly, unbonded, from the carding machine onto the film and into the nip of a pair of 10 inch diameter pressure rolls wherein fiber-to-fiber bonding to form a fibrous web was affected substantially simultaneously with bonding of the web to the film. Bonding was carried out at 500 pounds/inch. One of the pressure rolls had a smooth surface and was maintained at 130° C. The other had an embossed surface such that the bonding area, i.e., the area contacted by the raised surface of the embossments, was 10% of the total surface area of the resulting film structure. The embossed roll was maintained at 140° C.; line speed was 250 fpm.

The tear strength of this fiber reinforced film is 25 grams in the longitudinal direction and 139 grams in the transverse direction. This compares with about 4 grams in either direction for the unreinforced base film.

EXAMPLES 2-6

Examples 2 through 6 used the same set-up and procedure as is described in Example 1. Bonding area and fibrous web weight are varied to demonstrate the influence of these two variables on the properties of the laminates. The details of these examples are shown in Table 1 with data from Example 1 included for ease of comparison.

TABLE 1

| Example No. | Bonding Area (%) | Web Weight (gm/yd$^2$) | Elmendorf Tear Longitudinal | Strength (gm) Transverse |
|---|---|---|---|---|
| 1 | 10 | 10 | 25 | 139 |
| 2 | 10 | 40 | 74 | 224* |
| 3 | 100 | 10 | 42 | 237 |
| 4 | 100 | 40 | 100 | 373* |
| 5 | 45 | 25 | 60 | 351* |
| 6 | 15 | 20 | 80 | 338* |
| Control | N/A | None | 4 | 4 |

The asterisks on some of the transverse tear data indicate that the tear did not propagate completely across those samples in the transverse direction; instead, the tear started in the transverse direction, then turned and propagated along the easier tearing longitudinal direction. Thus, the tear value is artificially low and the sample is considered essentially untearable in the transverse direction.

Calender temperatures, line speed, and nip pressure influence laminate material properties less than bonding area and fibrous web weight. These process variables are listed in Table 2.

TABLE 2

| Example No. | Smooth Calender Temp. (°C.) | Embossed Calender Temp. (°C.) | Line Speed (fpm) | Nip Pressure (pli) |
| --- | --- | --- | --- | --- |
| 1 | 130 | 140 | 250 | 500 |
| 2 | 145 | 155 | 50 | 500 |
| 3 | 130 | 140 | 250 | 100 |
| 4 | 130 | 155 | 50 | 500 |
| 5 | 138 | 148 | 150 | 300 |
| 6 | 145 | 145 | 250 | 400 |

EXAMPLE 7

In this example, the film was the same as than employed in Example 1. The fibrous web was a prebonded polypropylene scrim of 1.5 dpf stable fiber with a web weight of 25 grams per square yard. Bonding conditions were: 100% bonding area, calender temperatures of 130° C., a line speed of 45 fpm and a nip pressure of 600 pli.

Tear strength of this laminate was 90 grams in the longitudinal direction and 357 grams in the transverse direction. As with examples 2, 4, 5 and 6, the transverse direction tore improperly, leading to an artificially low tear value.

EXAMPLE 8

In this example, the film was the same as that employed in Example 1. The fibrous web was a spunbonded polypropylene nonwoven having a weight of 21.5 grams per square yard. Bonding was accomplished on a heated press, in three steps:

(1) A 10 inch by 10 inch square of the unbonded laminate sample was placed in a "cool" (150° C.) press. Seven mil shims were placed around the sample to bear the majority of the 1,600 psi pressure load the closed press would otherwise exert on the sample.

(2) The press was closed and the steam was turned on for one and a half minutes to heat the press. The temperature set point was 149° C.

(3) The steam was turned off. After two minutes, the sample was removed.

Tear strength of this laminate was 176 grams in the longitudinal direction and 296 grams in the transverse direction.

EXAMPLE 9

In this example, the film was the same as that employed in Example 1. The fibrous web was an oriented polypropylene net structure (Delnet® by Hercules Incorporated). Bonding was accomplished on a heated press in three steps:

(1) A 10 inch by 10 inch square of the unbonded laminate sample was placed in a 94° C. press. Three mil shims were placed around the sample to bear the majority of the 1,600 psi pressure load the closed press would otherwise exert on the sample.

(2) The press was closed approximately two to five minutes.

(3) The sample was removed.

Tear strength of this laminate was 26 grams in the longitudinal direction and 49 grams in the transverse direction. As with Examples 2 and 4–7, the transverse direction tore improperly leading to an artificially low tear value.

EXAMPLE 10

The base film employed in this example was a 1.5 mil opaque biaxially oriented polypropylene film having, on one surface, a 0.15 mil heat seal coating. The heat seal coating was a mixture of 85% ethylene-vinyl acetate copolymer (Elvax 3190 from E. I. du Pont de Nemours & Co.), and 15% ethylenebutene copolymer (PB8640 from Shell Chemical Co.).

Bonding was done in a similar manner to Example 1. Bonding conditions were: 15% bonding area, a smooth calendar temperature of 145° C., an embossed calendar temperature of 155° C., a line speed of 250 fpm, and a nip pressure of 400 pli.

Tear strength of this laminate was 100 grams in the longitudinal direction and 123 grams in the transverse direction.

EXAMPLE 11

Example 8 was repeated except that the heat seal layer on the film was an ethylene-methacrylic acid copolymer (Surlyn 1702 from E. I. du Pont de Nemours & Co.).

Tear strength was 115 grams in the longitudinal direction and 130 grams in the transverse direction. Tearing occurred with delamination of the fiber from the film.

EXAMPLE 12

Example 8 was repeated using a transparent polypropylene film rather than the calcium carbonate-filled opaque film.

Tear strength was 314 grams in the longitudinal direction and 213 grams in the transverse direction.

What I claim is:

1. A high tear strength film comprised of a base film of biaxially oriented polypropylene having on one of its surfaces a layer of a lower melting polymer and, thermally bonded to said lower melting polymer layer, and coextensive with the biaxially oriented film, a fibrous polypropylene web, said web being bonded to the lower melting polymer layer in about 10 to 50% of the total surface area of the web.

2. The high tear strength film of claim 1 wherein the fibrous web has a weight of about 10 to 40 grams per square yard.

3. The high tear strength film of claim 2 wherein the fibrous web is a nonwoven polypropylene fabric.

4. The high tear strength film of claim 2 wherein the fibrous web is a polypropylene bonded staple fiber scrim.

* * * * *